United States Patent
Thiagarajan et al.

(10) Patent No.: US 7,234,303 B2
(45) Date of Patent: Jun. 26, 2007

(54) POLYMER ROOF PANEL SOLAR ENERGY CONVERSION DEVICE

(75) Inventors: Chinniah Thiagarajan, Bangalore (IN); Frans Adriaansen, Bergen op Zoom (NL)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/452,172

(22) Filed: May 30, 2003

(65) Prior Publication Data

US 2004/0237524 A1    Dec. 2, 2004

(51) Int. Cl.
*B60K 16/00*    (2006.01)

(52) U.S. Cl. .................... 60/641.8; 60/641.15

(58) Field of Classification Search ........... 60/641.8, 60/641.11, 641.12, 641.15
See application file for complete search history.

(56) References Cited

U.S. PATENT DOCUMENTS

| | | | |
|---|---|---|---|
| 4,003,363 A * | 1/1977 | Grossman ............... 126/661 |
| 4,094,717 A * | 6/1978 | Barr ..................... 156/197 |
| 4,123,003 A * | 10/1978 | Winston ................. 165/48.2 |
| 4,359,870 A | 11/1982 | Holton, Sr. |
| 4,443,987 A * | 4/1984 | Erb ..................... 52/309.1 |
| 4,468,849 A * | 9/1984 | Anderson et al. ......... 29/525.12 |
| 4,678,292 A * | 7/1987 | Miyatani et al. ........ 359/848 |
| 5,395,598 A * | 3/1995 | Prueitt .................. 422/168 |
| 5,608,268 A | 3/1997 | Senanayake |
| 6,089,021 A | 7/2000 | Senanayake |
| 6,497,074 B2 | 12/2002 | Nelson |
| 6,513,518 B1 * | 2/2003 | Girerd ................... 126/563 |
| 6,814,070 B2 * | 11/2004 | Bourne et al. .......... 126/623 |
| 2003/0214070 A1 | 11/2003 | Goossens et al. |

FOREIGN PATENT DOCUMENTS

DE    2055980    3/1981

* cited by examiner

*Primary Examiner*—Hoang Nguyen
(74) *Attorney, Agent, or Firm*—Paul J. DiConza; William E. Powell, III

(57) ABSTRACT

A solar energy conversion device comprises a solar collector configured to collect solar energy. The solar collector comprises a plurality of roof panels. Each of the panels comprises at least one roof sheet comprising at least one wall, and further comprises a substantially transparent thermoplastic polymer.

18 Claims, 11 Drawing Sheets

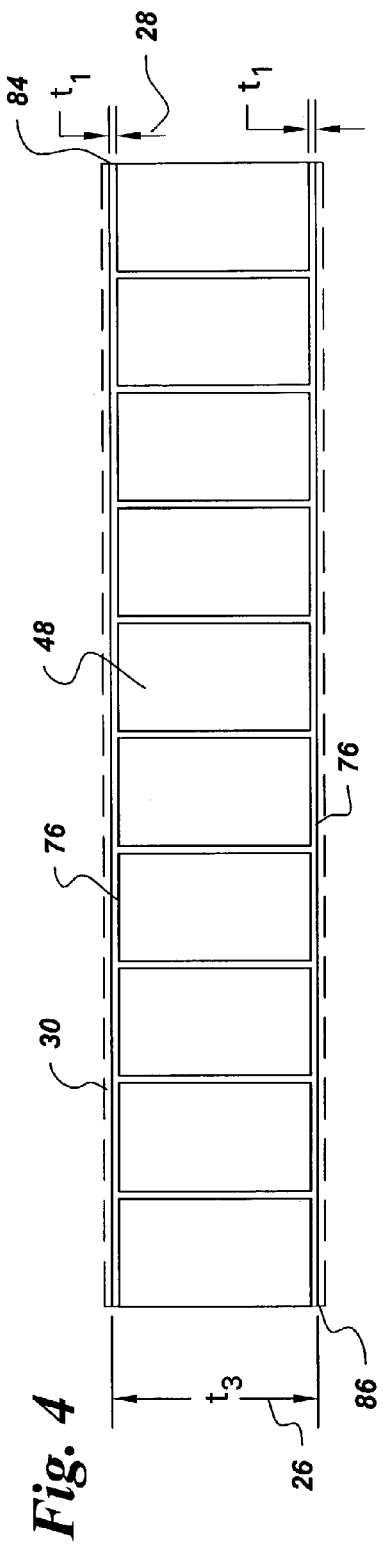
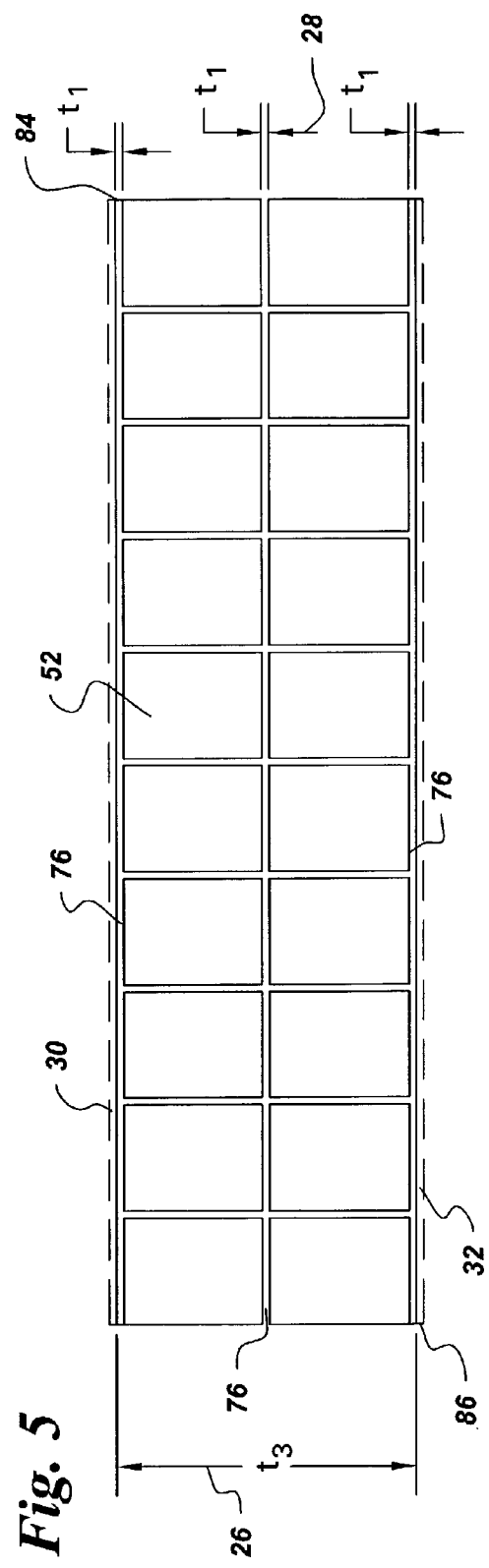
Fig. 4
Fig. 5

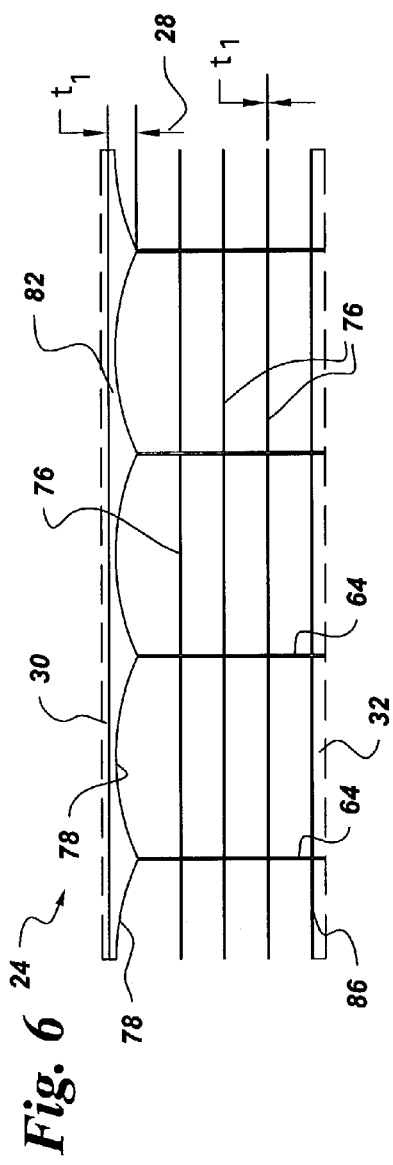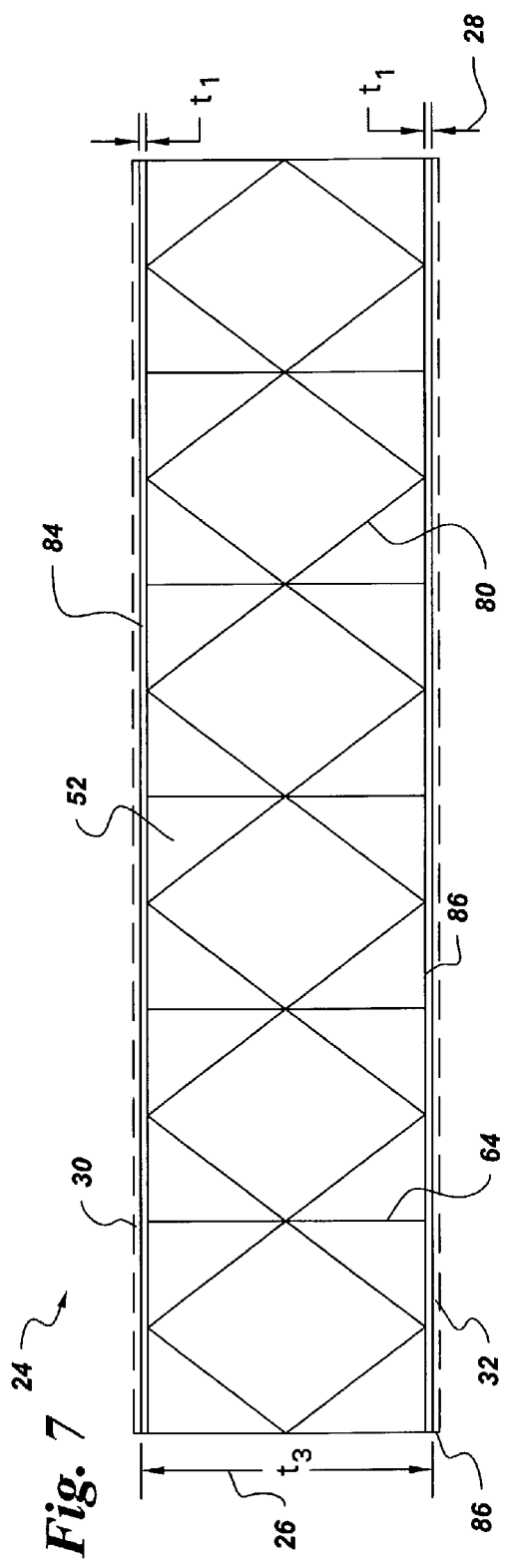

POLYMER ROOF PANEL SOLAR ENERGY CONVERSION DEVICE

BACKGROUND OF INVENTION

The present invention relates generally to solar energy conversion devices to generate power output and particularly to solar collector roof panels used therein.

Typical solar energy conversion devices of the type known as a "solar chimney" use a solar collector built from several transparent roof panels to transmit solar radiation therethrough. Solar energy transmitted by the solar collector heats a fluid, typically air, contained within the solar energy conversion device. The resulting thermal energy in the fluid is converted to kinetic energy to maintain a convective updraft between the solar collector and a chimney, and this kinetic energy is used to drive a turbine coupled to a generator to produce power output.

The solar collector should desirably have sufficient thermal insulation to retain the thermal energy within the fluid while enabling efficient transmission of solar radiation thereto. However, conventional solar collectors typically comprise modular glass panels having poor thermal insulation properties. Solar collectors generally have relatively large surface area to ensure adequate thermal performance of the solar collector. For example, a solar collector design for a typical 200 megawatt power station has typically about 5 Km overall diameter so as to operate at an estimated overall efficiency level of about 70%. Such solar collectors should be substantially reinforced with adequate support structure at appropriate span lengths to maintain overall structural integrity when exposed to the substantial load caused by wind impinging on the large surface of the collector. Fabricating and maintaining a solar-energy-based power plant made from modular glass solar collectors require substantial capital investment, which adversely affects cost effectiveness of power generated by the plant.

Solar collectors fabricated from roof panels comprising thin polymer films have been contemplated. In such a design, overall thermal insulation of the solar collector is enhanced to a certain extent, but in practice maintaining structural integrity of the roof panel comprising such thin polymer film poses a challenge, particularly when the solar collector is subjected to substantial wind load.

Accordingly, there is a need in the related art to address enhancement of performance of the solar collector while minimizing size and weight to render overall cost effectiveness, without compromising structural integrity of the solar collector assembly.

BRIEF DESCRIPTION

Briefly, in accordance with one embodiment of the present invention, a solar energy conversion device comprises a solar collector configured to collect solar energy. The solar collector comprises a plurality of roof panels. Each of the panels comprises at least one roof sheet comprising at least one wall. The roof sheet comprises a substantially transparent thermoplastic polymer.

Another embodiment of the present invention provides a solar energy conversion device comprising a solar collector to collect solar energy. The solar collector comprises a plurality of roof panels. Each of the roof panels comprises at least one substantially pre-stressed and substantially pre-curved polycarbonate twin wall roof sheet. The at least one roof sheet has a length of at least about 12 meters and has a thickness in the range from about 15 mm to about 18 mm. The roof sheet comprises at least one coating layer disposed on at least one of a top surface and a bottom surface of the roof sheet.

Another embodiment of the present invention provides a roof panel assembly for a solar collector. The roof panel assembly comprises at least one roof sheet further comprising at least one wall. The roof sheet comprises a substantially transparent thermoplastic polymer and the roof panel assembly is substantially pre-stressed and substantially pre-curved.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a sectional view of the roof sheet of FIG. 3 illustrating an exemplary cross sectional configuration of the single roof sheet in accordance with another embodiment of the present invention;

FIG. 5 is a sectional view of section of the roof sheet of FIG. 3 illustrating another exemplary cross sectional configuration of the single roof sheet in accordance with another embodiment of the present invention;

FIG. 6 is a sectional view of section of the roof sheet of FIG. 3 illustrating another exemplary cross sectional configuration of the single roof sheet in accordance with another embodiment of the present invention;

FIG. 7 is a sectional view of section of the roof sheet of FIG. 3 illustrating another exemplary cross sectional configuration of a single roof sheet in accordance with another embodiment of the present invention;

FIG. 12 is an exemplary load-deflection characteristics plot for a typically pre-curved polymer sheet; and.

DETAILED DESCRIPTION

Figure 1:
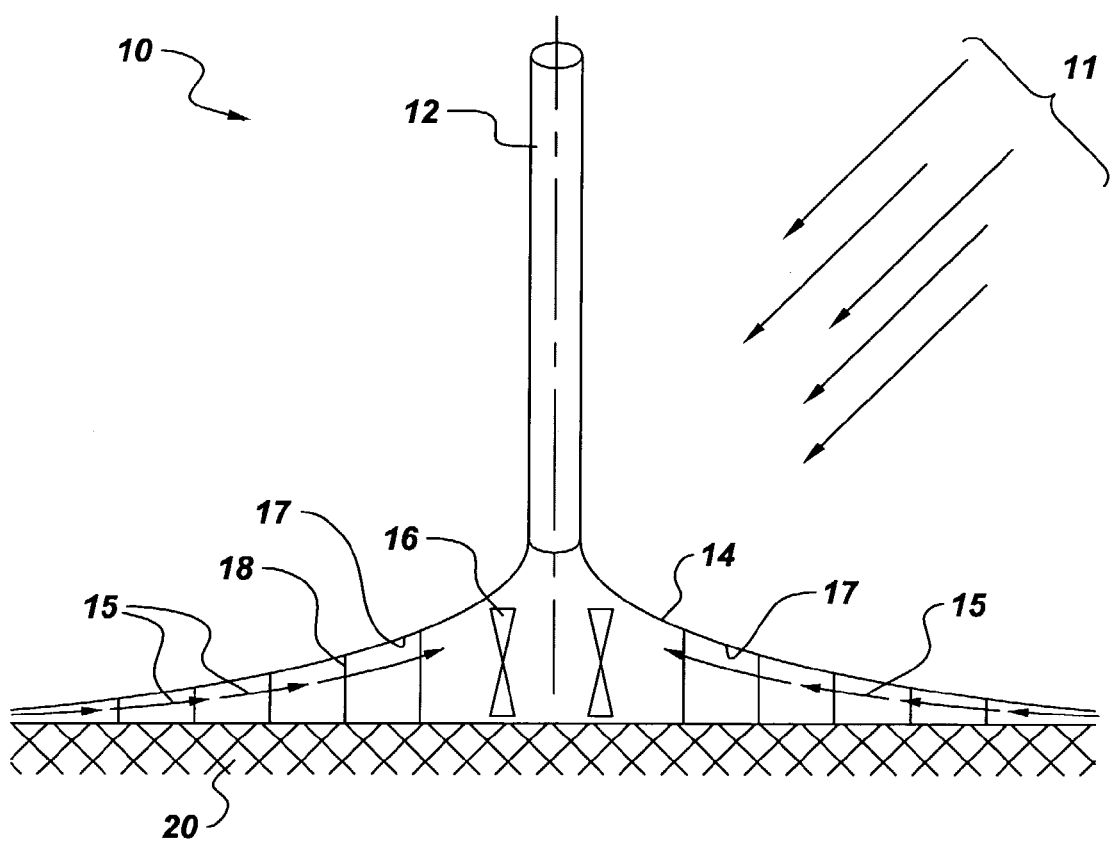
FIG. 1 is a schematic view of an exemplary solar energy conversion device assembly with a solar collector.
Figure 2:
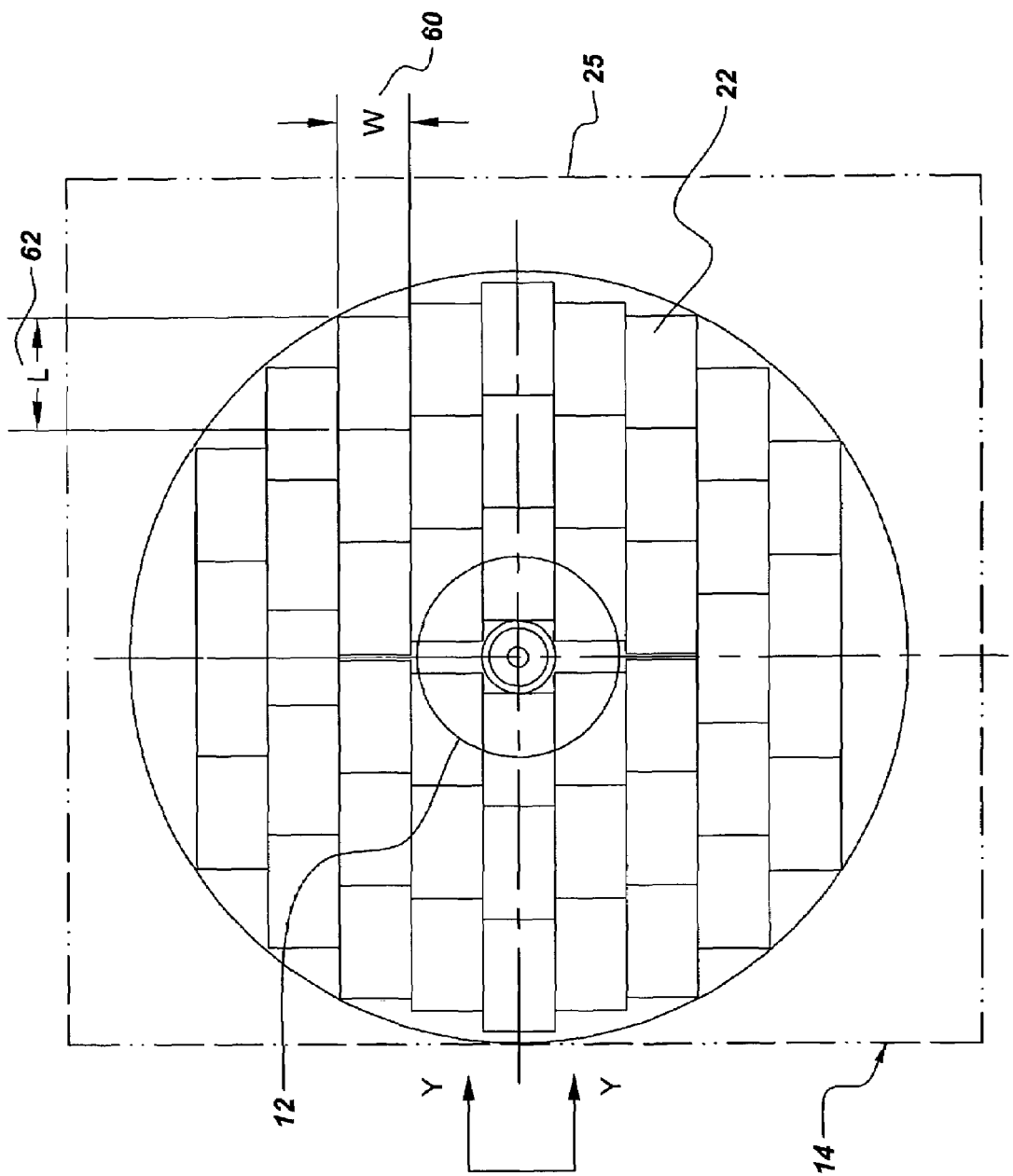
FIG. 2 is a exemplary plan view of FIG. 1 illustrating a typical solar collector having a plurality of roof panels.

A solar energy conversion device generates power from solar energy. A schematic view of an exemplary solar energy conversion device assembly 10 is shown in FIG. 1 and FIG. 2. Accordingly, as illustrated in FIG. 1, a solar energy conversion device 10 of the present invention comprises a solar collector 14, configured to collect solar energy from incident solar radiation 11. In some embodiments, a fluid 15, which is typically air, enters the solar energy conversion device 10 in contact with a bottom surface 17 of the solar collector 14. Accordingly, energy of the solar radiation 11 transmitted by the solar collector 14 transfers thermal energy to the fluid 15 flowing therethrough. A heat storage device 20, which, in some embodiments is typically positioned at bottom of the solar collector 14, ensures continuous transfer of thermal energy to the fluid 15, particularly during a period when incident solar radiation 11 is either unavailable or inadequate. In particular embodiments, thermal energy transferred by the solar radiation 11 is converted to kinetic energy of the fluid 15, and a continuous convective updraft is maintained through a chimney 12 due to typical thermally induced convection. Therefore, the chimney 12 coupled to the solar collector 14 maintains a continuous upward flow of fluid 15 between the solar collector 14 and the chimney 12. In certain embodiments, kinetic energy acquired by the fluid 15 is utilized to drive a turbine 16 coupled to a generator (not shown) to produce power output thereby.

Figure 3:
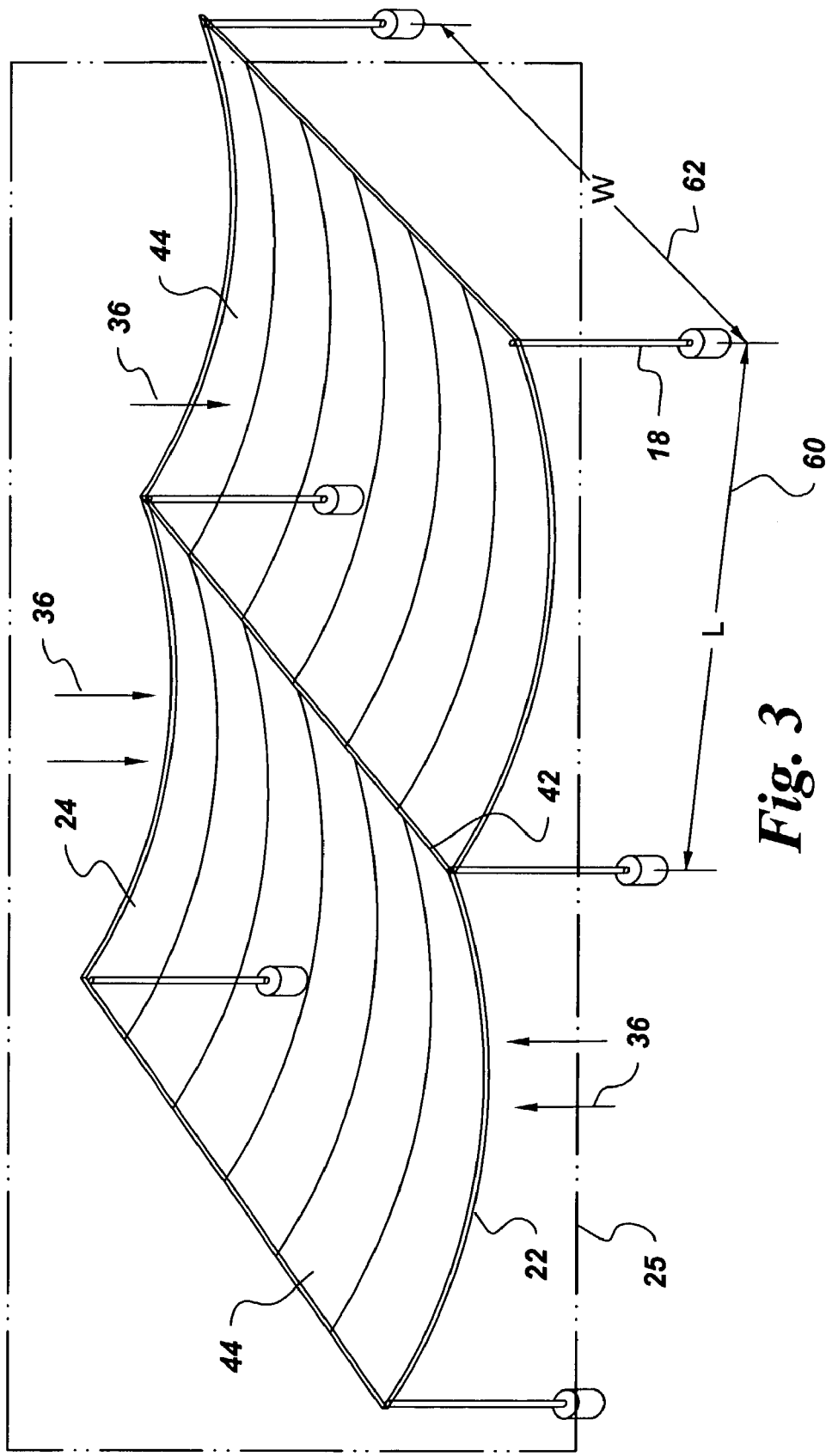
FIG. 3 is an exemplary perspective view of a solar collector viewed from section Y-Y in FIG. 2 illustrating typical arrangement of the roof panels and the roof sheets.

FIG. 2 is an exemplary plan view of FIG. 1, which shows the solar collector 14 comprising a plurality of roof panels 22. FIG. 3 shows an exemplary perspective view of the solar collector 14 viewed from section Y-Y in FIG. 2. FIG. 3 illustrates a typical arrangement of roof panels 22 comprising at least one roof sheet 24. Each roof sheet 24 is coupled to its respective adjoining sheets across a sheet-to-sheet joint 44. As further illustrated in FIG. 3, each roof panel 22 is coupled to its respective adjoining panels across a panel-to-panel joint 42, supported by a suitable structure 18 at a pre-determined span length "L" and a pre-determined span width "W".

The roof sheet 24 comprises a transparent thermoplastic polymer material. Roof sheet 24 desirably allows a substantial portion of the solar radiation 11, greater than about 80 percent for example, to be transmitted through the roof panels 22. On the other hand, the roof panels 22 should desirably have sufficient thermal insulating capacity to retain thermal energy gained by the fluid 15 from the solar radiation 11 in the solar collector 14. The polymer materials suitable for the roof sheet 24 having aforesaid properties of suitable transparency and insulation capacity, include, but are not limited to, polycarbonate, polyethylene, polymethyl methacrylate, polyvinyl fluoride and polypropylene. In particular embodiments, each of the roof panels 22 has a heat transfer coefficient typically less than about 3 W/m² °K. Accordingly, fabricating roof panels 22 from such polymer roof sheet 24 ensures improved thermal performance of the solar collector 14 while maintaining adequate transmission of solar radiation to the fluid 15 (see FIG. 1 through FIG. 3.)

FIG. 4 through FIG. 7 shows each of the roof sheets 24 comprising at least one wall 76 having a wall thickness "$t_1$" (indicated by Reference numeral 28) and an overall thickness "$t_3$" (indicated by Reference numeral 26). FIG. 4 through FIG. 7 show exemplary embodiments of the wall 76 and cross-sectional configuration of the roof sheet 24 comprising a plurality of walls 76. Such roof sheets 24 having a plurality of walls 76 include, for example a twin-wall roof sheet (FIG. 4 and FIG. 7), a triple-wall roof sheet (FIG. 5) and a five-wall roof sheet (FIG. 6).

Suitable cross-sectional configurations of the roof sheet 24 include, for example, a box configuration (FIG. 4 and FIG. 5), a tunnel configuration (FIG. 6) and an inclined configuration (FIG. 7). FIG. 4 and FIG. 5 depict the box cross-sectional configuration, characterized by rectangular shape. A tunnel cross sectional configuration, depicted in FIG. 6 has a top wall (designated by reference numeral 82) constructed of a typical curved inner surface 78 between two successive vertical ribs 64. Inclined cross-sectional configuration depicted in FIG. 7 has typical inclined-ribs or crossed-ribs 80 connecting the plurality of walls 76.

In some embodiments, the walls 76 have a thickness "$t_1$" in the range from about 0.4 mm to about 2 mm. In certain embodiments, the thickness "$t_1$" is in the range from about 0.5 mm to about 1.2 mm. In certain other embodiments, the thickness "$t_1$" is in the range from about 0.6 mm to about 0.9 mm. Generally, designing the thickness "$t_1$" of the wall 76 depends on a trade-off relationship among certain factors such as, for example, mechanical rigidity of the roof sheet 24 and manufacturing constraints thereof. For example, referring to FIG. 4 through FIG. 7, as the number of walls 76 making up the roof sheet 24 increases, significant gains in mechanical rigidity occur, but at the expense of the ease with which the roof sheet 24 is manufactured.

In some other embodiment, overall thickness "$t_3$" (indicated by Reference numeral 26) is in the range from about 10 mm to about 50 mm. In certain embodiments, the thickness "$t_3$" is in the range from about 12 mm to about 25 mm. In certain other embodiment, the thickness "$t_3$" is in the range from about 15 mm to about 18 mm. Generally, designing the overall thickness "$t_3$" of the roof sheet 24 depends on trade-off among factors, such as, for example mechanical rigidity under overall static and dynamic load experienced by the roof sheet 24 and manufacturing limitations such as extrudability thereof.

Figure 10:
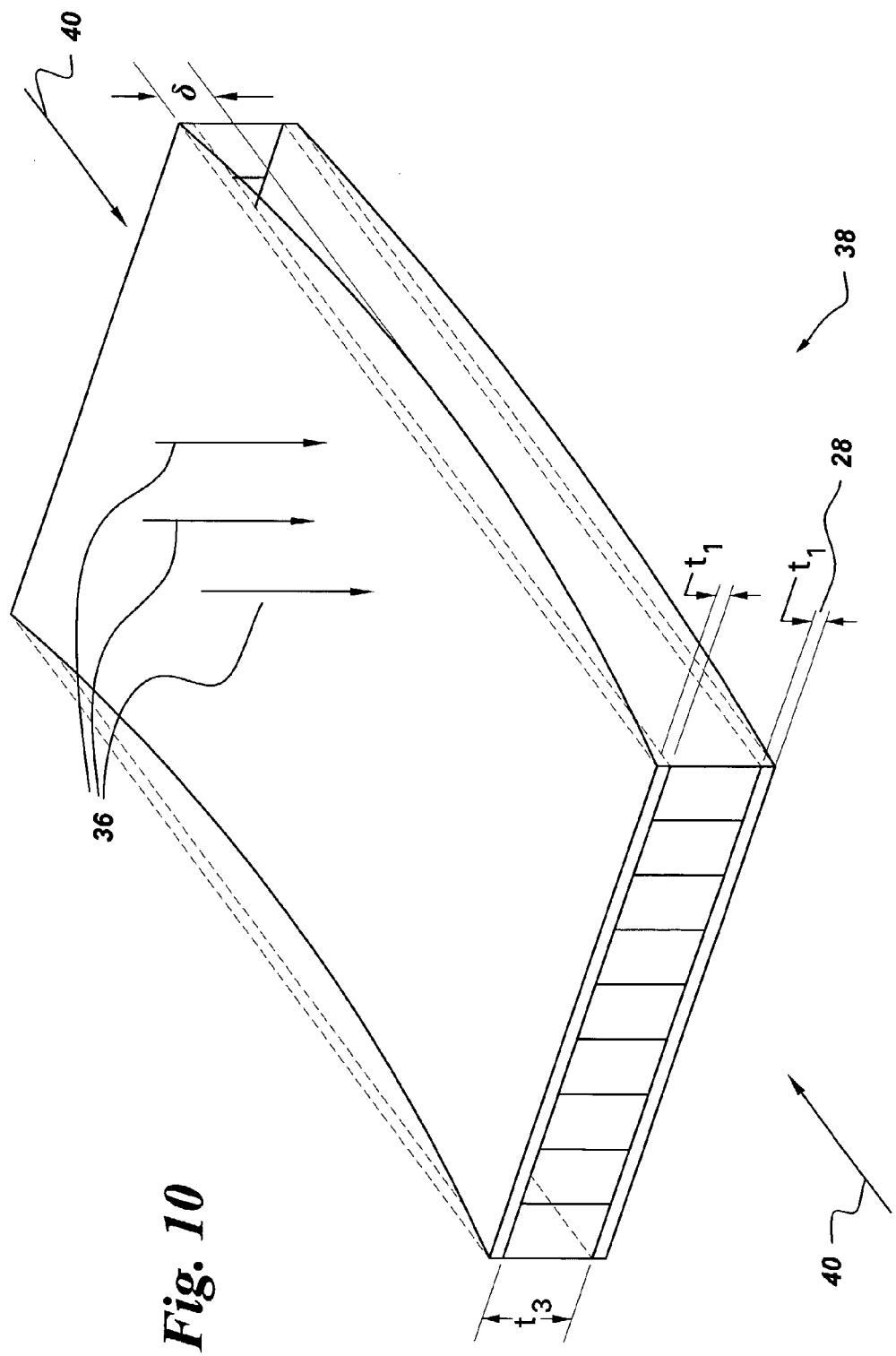
FIG. 10 is an exemplary perspective view illustrating the single roof sheet in accordance with another embodiment of the present invention.
Figure 11:
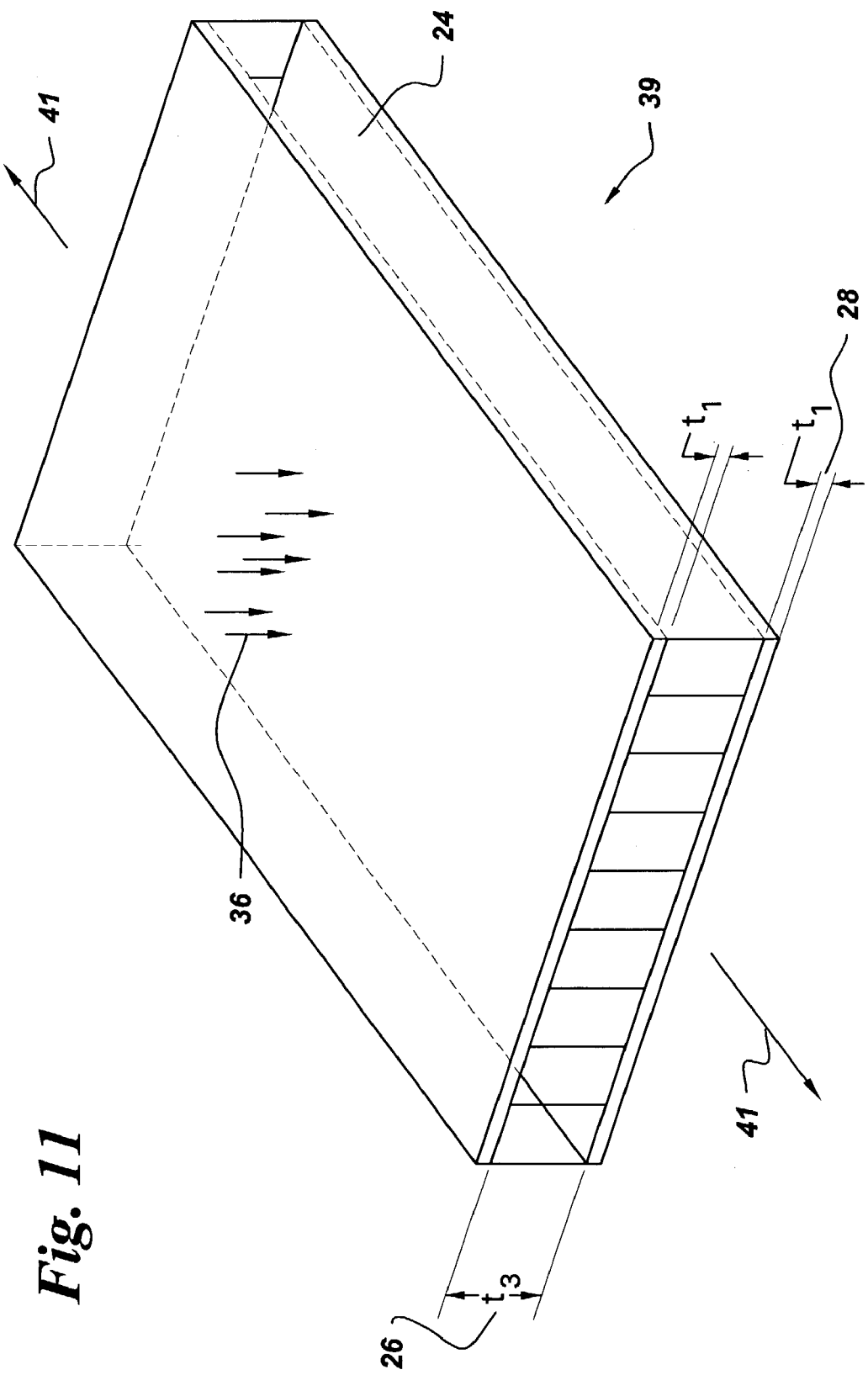
FIG. 11 is an exemplary perspective view illustrating the single roof sheet in accordance with another embodiment of the present invention.

FIG. 3 shows the roof panel 22 comprising the roof sheet 24 subjected to an atmospheric load 36, which is typically caused by a wind load. In one embodiment, shown in FIG. 10, roof sheet 38 is configured to be substantially pre-curved. The pre-curved roof sheet is designated by reference numeral 38, depicted in FIG. 10. The roof sheet 38 is pre-curved by applying a suitable external compressive force 40. As shown in FIG. 10, the compressive force 40 generates a pre-curvature "δ" in direction of the service load such as the atmospheric load 36 for example. As used herein, the term "substantially pre-curved" means pre-curving the roof sheet 38 to a pre-curvature "δ" having a value at least about 50 mm for example. In other embodiments, shown in FIG. 11, roof sheet 39 is configured to be substantially pre-stressed. The pre-stressed roof sheet is designated by reference numeral 39 depicted in FIG. 11. As used herein, the term "substantially pre-stressed" means pre-stressing the roof sheet 39 by applying another external tensile force 41 having a value of, for example, at least about 0.1 Newton per millimeter length of the roof sheet 39. Such pre-stressing induces a typical tensile membrane effect in the roof sheet 39, which consequently tends to mitigate stress, deformation and dynamic instability induced otherwise by a typical service load such as the atmospheric load 36.

Figure 8:
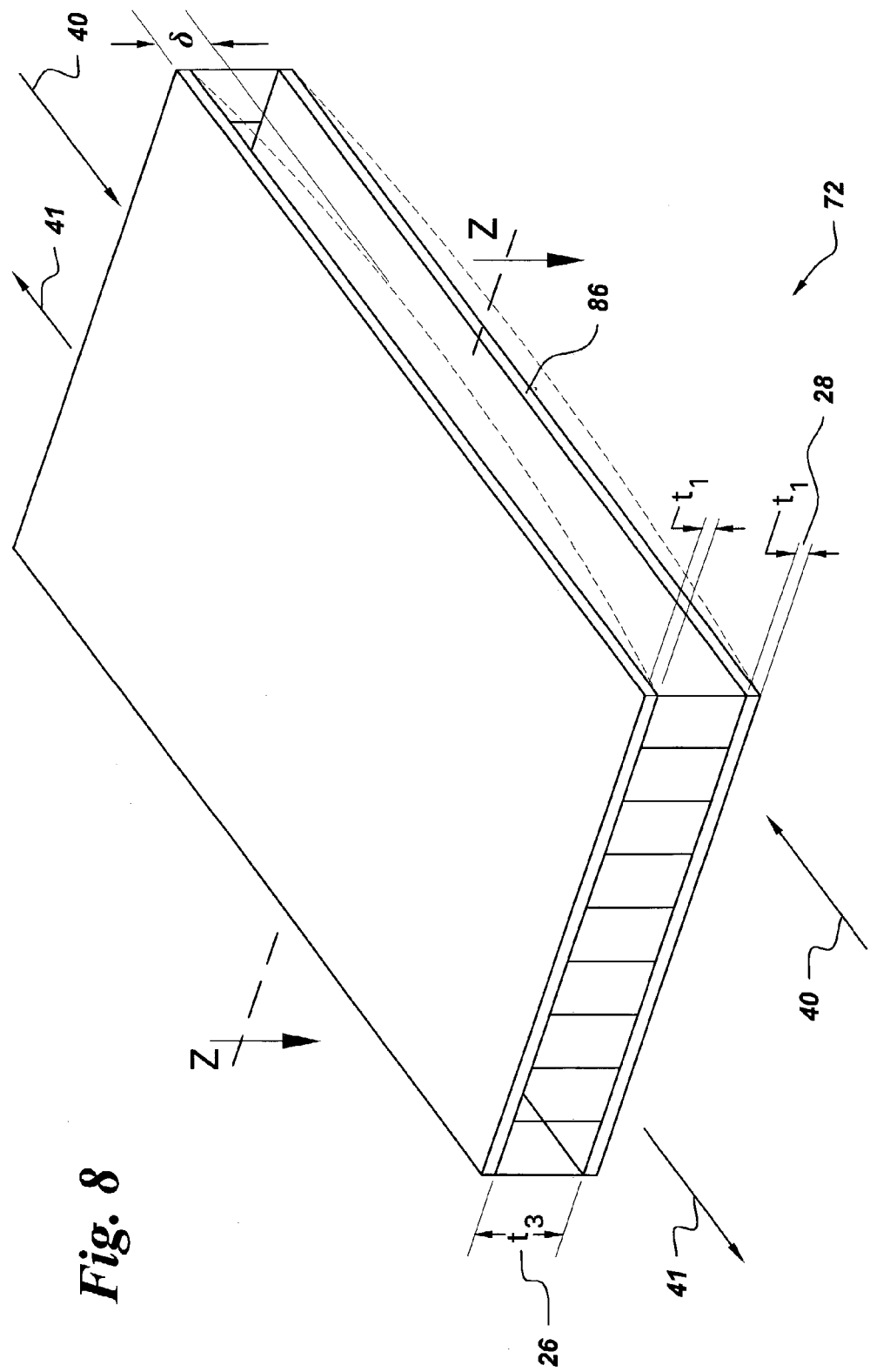
FIG. 8 is an exemplary perspective view illustrating a single roof sheet details in accordance with one embodiment of the present invention.
Figure 12:
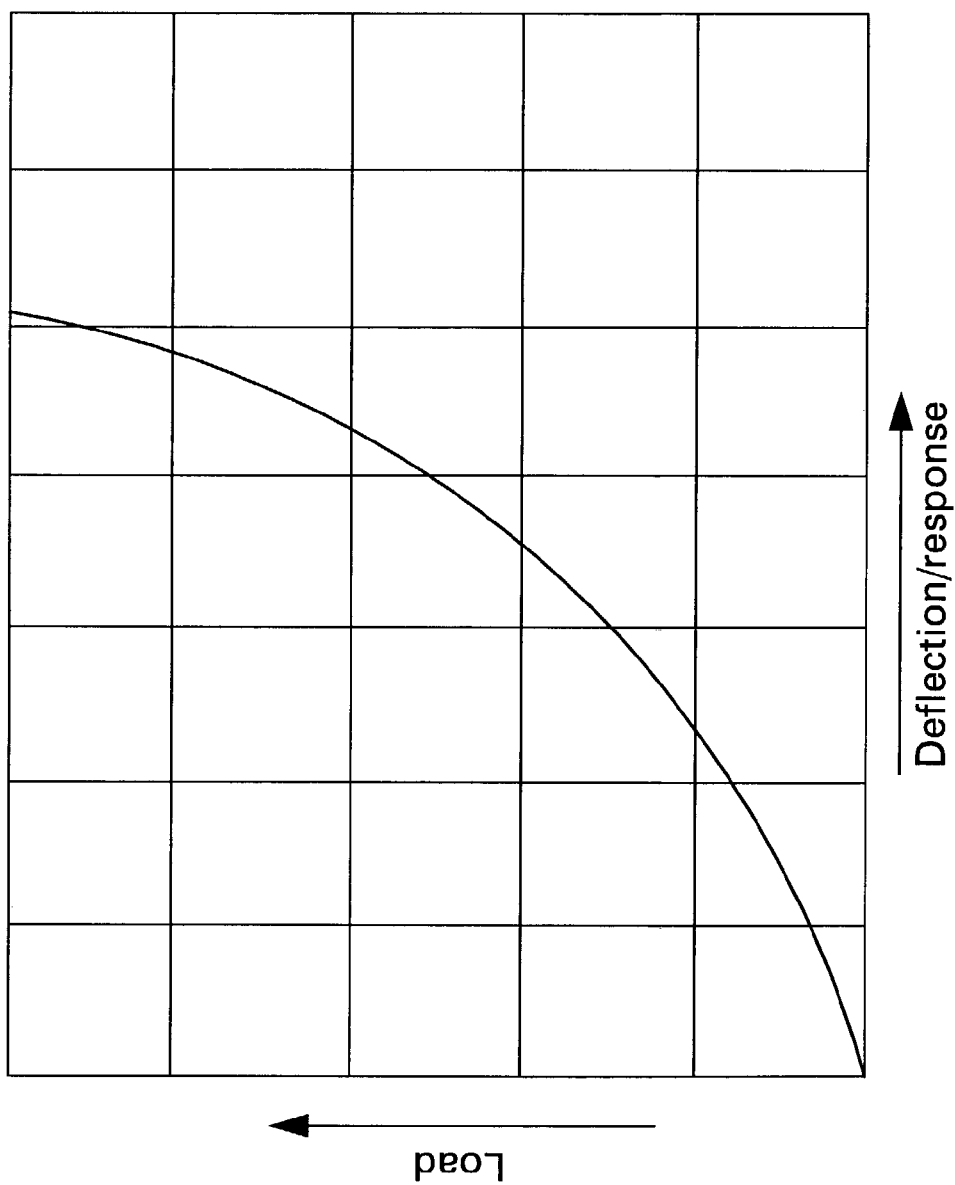
Figure 13:
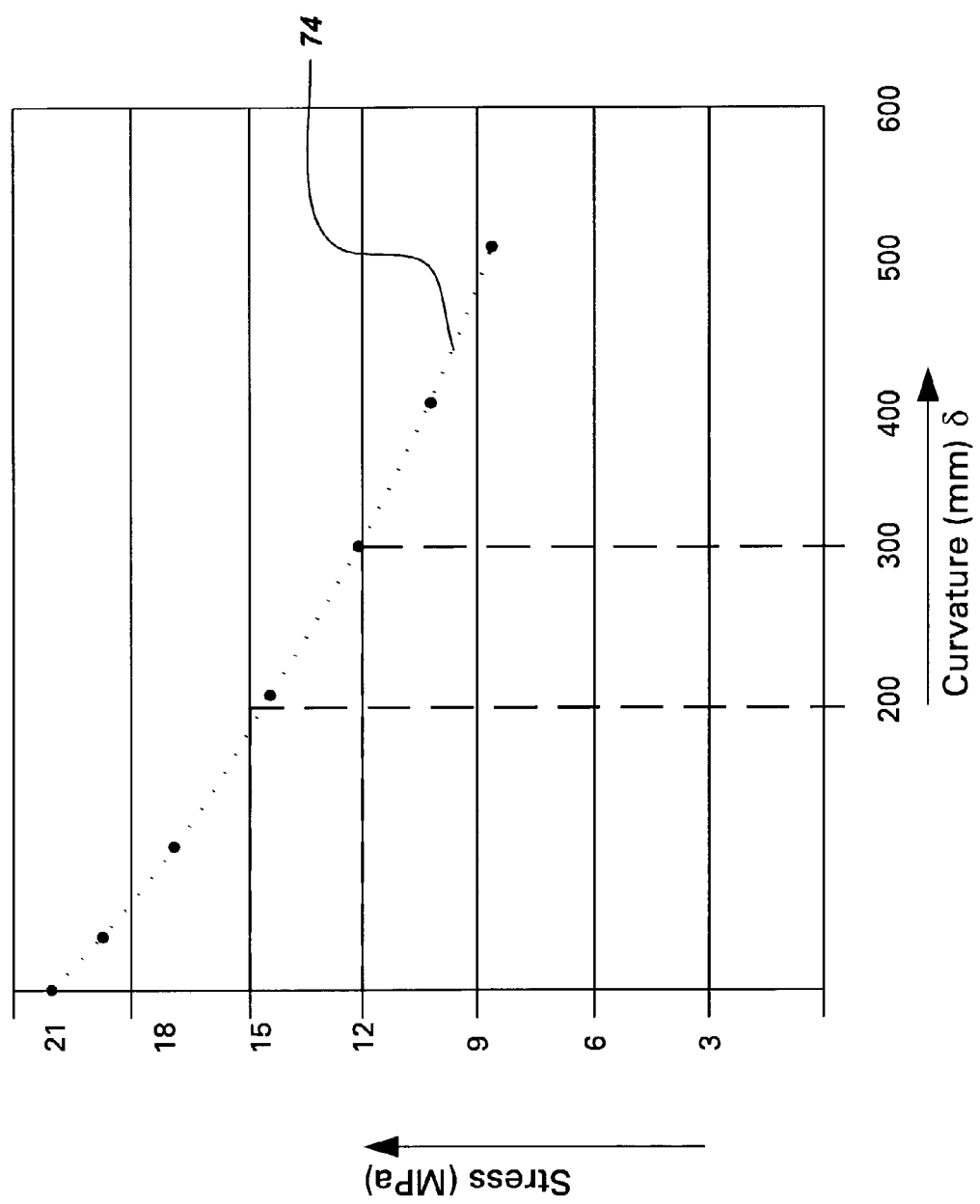
FIG. 13 is an exemplary pre-curvature-deflection plot and pre-curvature-stress characteristics plot for a typically pre-curved polymer sheet.

As depicted in FIG. 8, the compressive force 40 applied on the roof sheet 72 introduces the curvature "δ" in the roof sheet 72. The roof sheet 72 is often further pre-stressed by applying the tensile force 41. The amount of curvature "δ" introduced in the roof sheet 72 changes shape of such roof sheet 72 (see FIG. 8). Change in shape of the roof sheet 72 results in non-linear response or deflection thereof as a function of the external load applied thereupon (FIG. 12), resulting in a stiffer roof sheet 72 that is better able to withstand deflection due to external loads such as, for example, wind loading. FIG. 13 depicts an exemplary graphical plot 74 showing effect of changing the curvature "δ" on the stress induced in the roof sheet 72 by the external load. As depicted in FIG. 13, if the curvature "δ" introduced in the roof sheet 72 is changed to a value for example about 300 mm from an initial value of about 200 mm, corresponding stress level induced by an external load applied thereupon changes to about 12 MPa from an initial value of about 15 MPa.

The magnitude of pre-stressing and pre-curving tends to be limited by additional factors including, for example plastic deformation, which leads to permanent change in deformation behavior of the roof sheet 72. Hence, in certain embodiments, the roof sheet 72 is configured to have a curvature amount "δ" (FIG. 8) not greater than about 500 mm and in some other embodiments, the roof sheet 72 is configured to be pre-stressed by applying the external tensile force 41 not greater than about 0.5 Newton per millimeter length of the roof sheet 72.

Exemplary design parameters of the pre-stressed and pre-curved polymer roof panels 22 include wall thickness "$t_1$", overall thickness "$t_3$" and cross-sectional configuration of the roof sheet 72. Optimizing such design parameters, as above, depends on trade-off relationship among factors, such as, for example, structural stiffness, dynamic stability under atmospheric load, manufacturing constraints and overall weight of the roof panels 22.

Referring to FIG. 3, span length "L" between support structures 18 of each roof panel 22 is at least about 12 meters in certain embodiments. Positioning support structure 18 at the desired span length "L" ensures overall structural integrity of the roof panel 22 by providing adequate reinforcement. The desired span length "L" is selected depending on the trade-off between factors such as, for example, cost of fabricating the support structure 18 and overall structural integrity of the roof panel 22.

Figure 9:
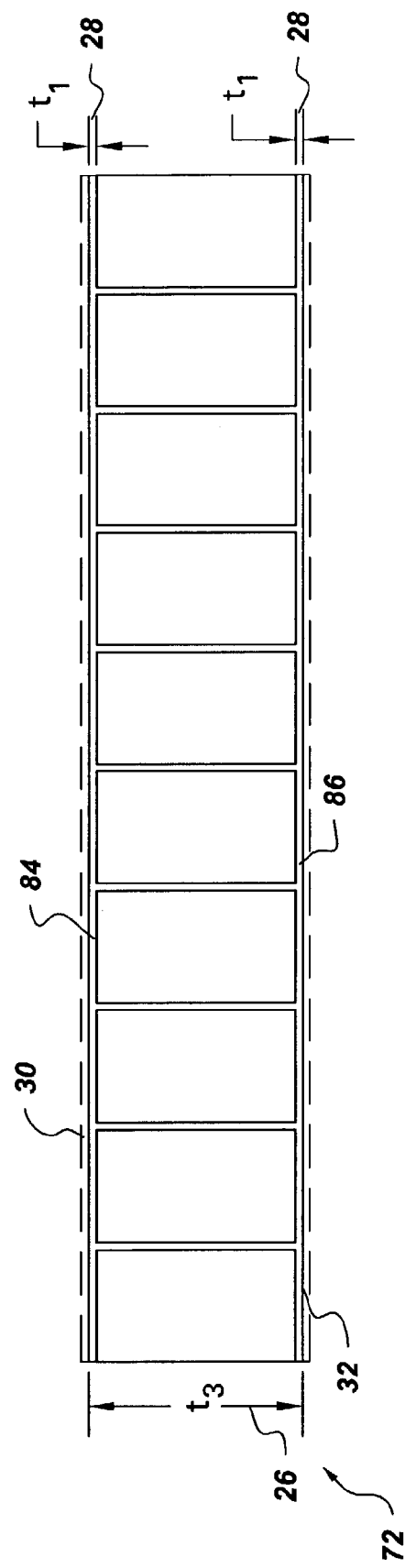
FIG. 9 is a sectional view of section Z-Z of FIG. 8 illustrating an exemplary cross sectional configuration of the roof sheet of FIG. 8 in accordance with one embodiment of the present invention.

As depicted in FIG. 4 through FIG. 7, the roof sheet 24 is provided with at least one coating layer 30, 32 disposed on at least one of a top surface 84 and a bottom surface 86 of the roof sheet 24. For example, one particular embodiment depicted in FIG. 8 and FIG. 9 shows an exemplary polycarbonate twin wall roof sheet 72 having such coating layers 30, 32 disposed on the top surface 84 and the bottom surface 86 of the roof sheet 72. The coating layers 30, 32 are provided as required to perform various functions that improve the overall performance of roof sheet 72. Possible functionalities of such coating layers 30, 32 include, but are not limited to, a biocidal layer, an anti-reflective layer, a self-cleaning layer, an ultra-violet radiation protective layer, a condensation protective layer, and combinations of any of these.

A condensation protective layer comprises a hydrophilic coating layer, which prevents condensation of atmospheric moisture such as fog and mist on the roof sheet 72. Coating materials having this property include, among other materials known in the art, polyvinylbutyral-based compounds and polyvinylpyrrolidone-based compounds.

A biocidal layer comprises a coating that substantially prevents the growth and accumulation of biological agents such as, for example, algae, fungi, and bacteria. Exemplary coatings having this property include, among other materials known in the art, zinc oxide and zinc borates.

An optical reflection protective coating layer comprises a coating that allows a substantial portion of the incident solar radiation to be transmitted through, rather than reflected by, the roof sheet 72. Coating materials having this property include, but are not limited to metallic oxides such as indium oxide, titanium dioxide, cadmium oxide, gallium-indium oxide, niobium-pentoxide, indium-tin oxide, magnesium fluoride and combinations thereof.

A self-cleaning coating layer comprises a hydrophobic coating layer, which disintegrates dust particles that would otherwise accumulate on the roof sheet 72. Coating materials having such property include, but are not limited to, siloxane-based compounds and polycarbonate-siloxane-based co-polymeric compounds known in the art.

The ultra-violet radiation protective layer provides photostabilization of the roof sheet 72 material, thereby protecting the material against degradation by ultra-violet radiation. Coating materials having this property include, but are not limited to, benzotiazole-based compounds, benzophenone-based compounds, triazine-based compounds and hindered-amine light stabilizing compounds known in the art.

In order to take advantage of the aspects of the invention as described above, a particular embodiment of the invention includes a solar energy conversion device 10 comprising a solar collector 14 configured to collect solar energy. The solar collector 14 comprises a plurality of roof panels 22. Each of the roof panels 22 comprises at least one "substantially pre-stressed" and "substantially pre-curved" polycarbonate twin wall roof sheet 72. The roof sheet has a length of at least about 12 meters and a thickness "$t_3$" in the range from about 15 mm to about 18 mm. The roof sheet 72 further comprises at least one coating layer 30, 32 disposed on at least one of a top surface 84 and a bottom surface 86 of the roof sheet 72 (see FIG. 8 and FIG. 9).

Further embodiments of the invention include a roof panel assembly 25 (see FIG. 3). Each of the roof panel 22 comprises at least one roof sheet 24. The roof sheet 24 comprises a substantially transparent thermoplastic polymer. Such roof sheet having at least one wall 76 is configured to be pre-stressed and pre-curved. The pre-stressed and or pre-curved roof sheet is designated by reference numeral 72 in FIG. 8. and FIG. 9. The aspects of the roof panel assembly 25 of the present invention are identical to those described above for roof panels 22 used in certain embodiments of the solar energy conversion device 10

It will be apparent to those skilled in the art that, although the invention has been illustrated and described herein in accordance with the patent statutes, modification and changes may be made to the disclosed embodiments without departing from the true spirit and scope of the invention. It is, therefore, to be understood that the appended claims are intended to cover all such modifications and changes as fall within the true spirit and scope of the invention.

What is claimed is:

1. A solar energy conversion device comprising:
    a solar collector configured to collect solar energy, wherein said solar collector comprises a plurality of roof panels, each of said panels comprising at least one transparent, multi-wall thermoplastic polymer roof sheet that is pre-stressed in a tensile membrane stress state;
    a fluid in contact with a bottom surface of said solar collector; and
    a chimney coupled to said solar collector to allow said fluid to flow between said collector and said chimney.

2. The solar energy conversion device of claim 1, wherein said thermoplastic polymer comprises a material selected from the group consisting of polycarbonate, polyethylene, polymethyl methacrylate, polyvinyl fluoride and polypropylene.

3. The solar energy conversion device of claim 1, wherein said roof sheet comprises at least one of a twin-wall roof sheet, a triple-wall roof sheet and a five-wall roof sheet, and wherein said roof sheet further comprises a cross-sectional configuration of said walls to support said roof sheet.

4. The solar energy conversion device of claim 3, wherein said cross-sectional configuration comprises at least one of a box configuration, a tunnel configuration and an inclined configuration.

5. The solar energy conversion device of claim 1, wherein each wall of said roof sheet has thickness in the range from about 0.4 mm to about 2 mm.

6. The solar energy conversion device of claim 5, wherein each wall of said roof sheet has thickness in the range from about 0.5 mm to about 1.2 mm.

7. The solar energy conversion device of claim 6, wherein each wall of said roof sheet has thickness in the range from about 0.6 mm to about 0.9 mm.

8. The solar energy conversion device of claim 1, wherein said roof sheet has thickness in the range from about 10 mm to about 50 mm.

9. The solar energy conversion device of claim 8, wherein said roof sheet has thickness in the range from about 12 mm to about 25 mm.

10. The solar energy conversion device of claim 9, wherein said roof sheet has thickness in the range from about 15 mm to about 18 mm.

11. The solar energy conversion device of claim 1, wherein each of said roof panels has a heat transfer coefficient less than about 3 W/m$^2$ $^\circ$K.

12. The solar energy conversion device of claim 1, wherein each of said roof sheet comprises at least one coating layer disposed on at least one of a top surface and a bottom surface of the roof sheet.

13. The solar energy conversion device of claim 12, wherein said at least one coating layer comprises at least one of a biocidal layer, an anti-reflective layer, a self-cleaning layer, an ultra-violet ray protective layer, a condensation protective layer and combination thereof.

14. The solar energy conversion device of claim 1, wherein each of said roof sheets has a length of at least about 12 meters.

15. The solar energy conversion device of claim 1, wherein said fluid comprises air.

16. A solar energy conversion device comprising:

a solar collector to collect solar energy, said solar collector comprising a plurality of roof panels, wherein each of said roof panels comprises at least one transparent polycarbonate twin wall roof sheet, wherein said at least one roof sheet has a length of at least about 12 meters, has a thickness in the range from about 15 mm to about 18 mm, and comprises at least one coating layer disposed on at least one of a top surface and a bottom surface of said roof sheet;

a fluid in contact with a bottom surface of said solar collector;

a chimney coupled to said solar collector to allow said fluid to flow between said collector and said chimney;

a turbine configured to be driven by said fluid; and a generator coupled to said turbine for the production of power from the motion of the turbine;

wherein said at least one roof sheet is a pre-stressed sheet in a tensile membrane stress state.

17. The solar energy conversion device of claim 1, further comprising a turbine configured to be driven by said fluid.

18. A solar energy conversion device comprising:

a solar collector configured to collect solar energy, wherein said solar collector comprises a plurality of roof panels, each of said panels comprising at least one curved, transparent, multi-wall thermoplastic polymer roof sheet;

a fluid in contact with a bottom surface of said solar collector; and a chimney coupled to said solar collector to allow said fluid to flow between said collector and said chimney;

wherein said at least one curved roof sheet has a curvature of up to about 500 millimeters concave with respect to the bottom surface of the solar collector.

* * * * *